Inventor:
Michael Maul

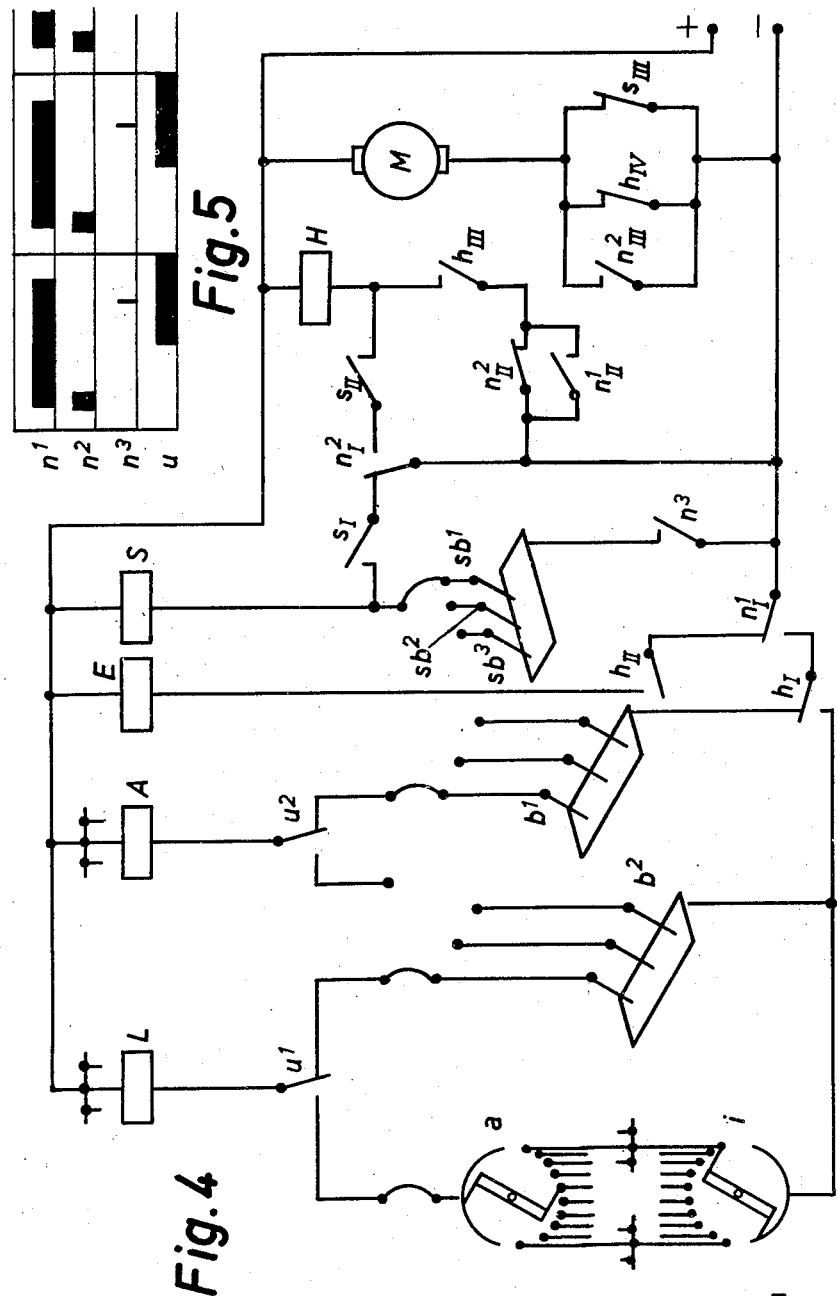

United States Patent Office 2,828,912
Patented Apr. 1, 1958

2,828,912
RECORD CARD CONTROLLED MACHINES

Michael Maul, Schwabach, near Nurnberg, Germany

Application December 30, 1953, Serial No. 401,264

Claims priority, application Germany January 5, 1953

15 Claims. (Cl. 235—61.1)

The present invention relates to a record card controlled machine. In the preferred embodiment of the present invention item cards sorted in groups and blank cards interspersed between the groups of item cards are fed index position by index position past a row of punches and past a row of analyzers. The item cards control accumulators upon their passage past the row of analyzers and each blank card causes total taking and therewith control of the row of punches by the accumulators during the passage of the blank card past the row of punches. The total taking is caused by a total taking device responsive to a special mark distinguishing the blank cards from the item cards so that by the total punching operation the blank card acting as total taking card will become a total card belonging to the preceding group of item cards.

The provision according to the invention leads to an extraordinarily simple total card punch which opens new possibilities in the art of punched card machinery. This new way departs from the usual tabulating machines which due to the manifold cooperation of accumulating and printing mechanisms as well as of the associated controlling devices are not only very bulky but also very complicated. In place of this single machine rather two separate smaller and simpler machines are used. One machine may be a total card punch according to the invention in which the items of the item cards are computed by accumulators and in which a total card is punched for each group. The cards used for said purpose are interspersed as blank cards or total taking cards respectively between the groups of item cards and are punched with the total data upon the passage past the punching device. For printing of the data of the item and total cards only a table printer having no accumulators has to be provided as a second machine.

The machine according to the invention also permits a very simple manner of total card punching which may be designated by "multiple run total card punching." In this method the cards run repeatedly through the machine and in each run different item fields are computed and different total fields are punched. This provision is possible upon the application of the invention without any additional means. It is for this reason that the machine according to the invention is particularly adapted for the application within a system of small type machines in which system accordingly the total card punch needs only a small number of accumulators but nevertheless permits the punching of an essentially larger number of totals in total fields if the cards run repeatedly through the machine.

If cards having a plurality of rows of record columns, that is a plurality of decks, are used in the machine according to the invention, preferably a row of punches common to all decks, and a row of analyzers for the item data also common to all decks are provided.

A particular advantage of an embodiment of the invention resides in that the group perforation upon the total card can be gained without using a storing device. This is obtained by a further row of analyzers arranged in the feeding direction of the cards behind the row of analyzers for the item cards. This further row of analyzers derives the group data from the last item card of a group and controls the punching mechanism in accordance with this group number while the blank card is passing the row of punches to receive at the same time the total perforation.

In a preferred embodiment the row of analyzers for the item data is located behind the row of punches in the feeding direction of the cards while the analyzer for the total taking device is located forwardly of the row of punches.

When employing the machine according to the invention it is also possible to obtain total compilations for groups of higher order. For instance, at first sub-group totals may be obtained and corresponding sub-group total cards punched. The sub-group total cards, however, may be computed separately and thereby main-group total cards obtained. In a similar manner from the main-group total cards super-group total cards may be obtained. Accordingly, in this manner of operation the cards of the lower order act always as item cards while the total taking cards are the cards of the higher order and are finally made total cards of the higher order.

In order to permit the above indicated manner of operation the total cards of the various orders are provided with a total taking hole in a different position for each order. In the preferred embodiment according to the invention a plurality of special mark responsive analyzers is provided, one for each of the different positions of the total taking hole on the total card, each of said analyzers being adapted to be rendered effective at will. Accordingly, it can be accomplished in a simple manner that the total card of the lower order has no influence upon the total taking operation so that it can act as item card while the total taking card of the higher order causes making of the total upon itself, such total being derived from the total cards of the lower order.

In the machine according to the present invention it is also possible to arrange the data fields in the total cards in a manner different from the field arrangement on the item cards, for better utilizing the total cards. Also the group data may be punched in the summary card in a field different from the group data field in the item cards.

An embodiment of the invention is shown in the accompanying drawings. Herein, essentially a diagrammatical illustration for the known devices has been chosen since for instance the analyzing mechanism, the accumulator and the punching mechanism are known in various constructions.

Fig. 4 shows the wiring diagram of the machine.

Fig. 5 shows the time diagram for the cam controlled contacts.

Figure 1:
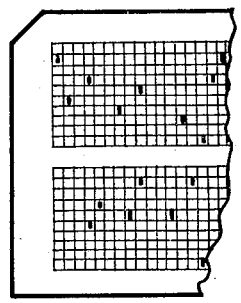
Fig. 1 shows a portion of the punched card as it is used for the embodiment described herein.
Figure 2:
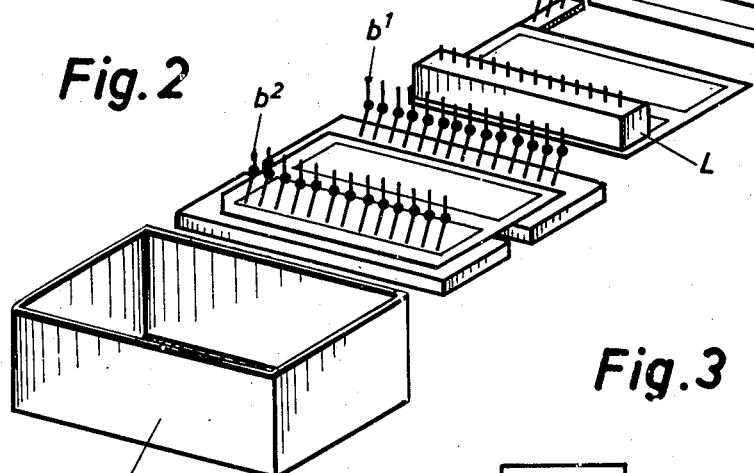
Fig. 2 shows in a perspective arrangement the position of the cards relatively to the analyzing devices and to the punching mechanism.
Figure 3:
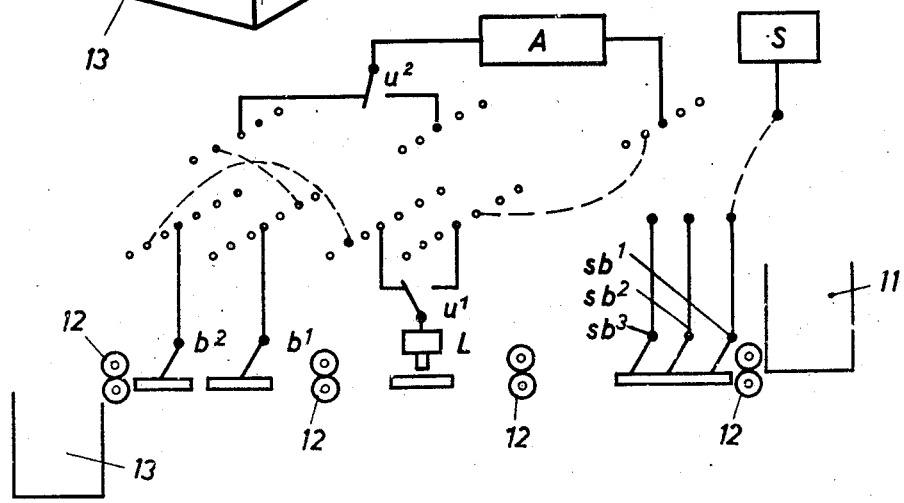
Fig. 3 shows diagrammatically an operating diagram from which particularly may be seen the relative arrangement of the analyzing devices and the punching mechanism and in addition thereto the plugging of the various devices with regard to each other.
Figure 6:
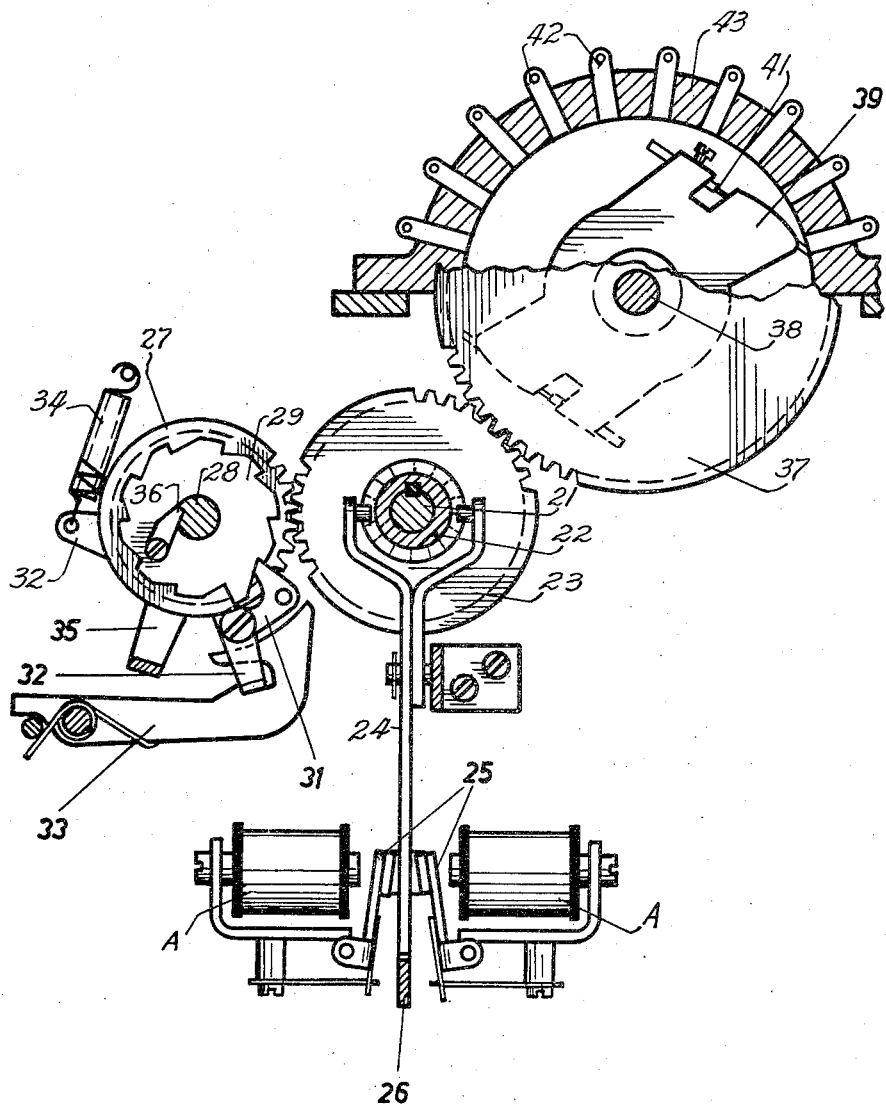
Fig. 6 shows a section through a known accumulator for obtaining the totals as it is used in the machine described herein.

Now, before the machine is described in detail the basic manner of operation shall be explained. The item cards being sorted according to groups are inserted into the magazine 11, one of said item cards being shown for example in Fig. 1. The cards comprise two perforation decks, each having ten hole positions per perforation column. Punching into the cards is effected according to the so called single hole system. At the end of each group of these item cards there is inserted a blank card which has only a controlling hole in the right margin of the card, which hole in the further description shall be designated by summary hole, since in this card is punched the total of the group of item cards.

The cards are fed step by step by the feed rollers 12 from the magazine 11 past the analyzing brushes $sb^1$, $sb^2$, $sb^3$, the punching device L, the row of brushes $b^1$ and $b^2$. After the cards have passed the row of brushes $b^2$ they are deposited into the magazine 13. As long as there are only item cards fed to the analyzing devices, only the brushes $b^1$ are set to the analysis which brushes analyze the amount perforations of the item cards and transfer said perforations to the accumulator A in which the amounts of the items are computed.

When a group of items is finished and a blank card having a summary hole is following thereafter this special hole is analyzed by one of the brushes $sb^1$, $sb^2$ or $sb^3$, respectively, and an impulse is transferred to the storing device S. When this operating cycle is finished in which the summary hole has been determined the machine is shifted for total taking through the storing device S. In the meantime the blank card equipped with the special hole has been fed so far as to have its first hole position below the punching device L. In the now following operating cycle punching of the total takes place, said total having been computed in the accumulator A. Simultaneously therewith the last item card of the preceding group of item cards is analyzed by the brushes $b^2$, part of which is also plugged to the punching mechanism. The brushes $b^2$ analyze the group data and transfer them to the punching mechanism so that the group data are also punched into the blank card. At the end of this operating cycle the accumulator A is zeroized and is prepared for receiving the amounts of the next group of item cards, which follows the blank card without any interruption.

The two decks of the card are analyzed one after the other or are punched. In order to utilize the columns of the two decks as wanted the shifting contacts $u^1$ and $u^2$ are provided which upon deck change shift the accumulators or the punching mechanisms to other plugging spots and therewith to other perforation columns.

By means of the wiring in Fig. 4 and the cam diagram in Fig. 5 now the manner of operation of the machine shall be explained in detail. In the illustration of the wiring for the machine a simplified method has been chosen, as generally used in the art of communication.

When the motor M is switched on current flows from negative through the two contacts $h_{IV}$ and $s_{III}$, through the motor M to positive. The first item card is now fed to the summary hole brushes $sb$. When this card is under the brushes $sb$ the cam contact $n^3$ closes temporarily. Since, however, in this case the brushes $sb$ do not detect a summary hole in the card the machine continues running without any shifting and feeds the card to the analyzing brushes $b^1$. Shortly before the first position of the card is under the brushes $b^1$ the cam contact $n^1_I$ shifts and therewith prepares the circuit to the brushes $b^1$. If the brushes $b^1$ detect a hole during the following analysis, current flows from negative through the cam contact $n^1_I$, the contact $h_I$, through the brush $b^1$, the plug board, the contact $u^2$, through the magnet A of the accumulator to positive. The latter responds and causes the accumulator place which is associated with said magnet to be advanced in accordance with the punching in a manner to be still described. Upon deck change the cam contact $u^2$ and therewith the magnets of the accumulator are set to other plugging spots, thereby enabling now other perforation columns to operate on other magnets of the accumulator.

At the end of the operating cycle the cam contact $n^1_I$ returns again to its initial position in order to shift again at the beginning of the analysis of the next card by the brushes $b^1$. By this means the circuit to the brushes is interrupted during the card change. Analyzing of the following cards by the brushes $b^1$ is now repeated for each card, as just described, as long as the brush $sb^1$ does not detect a special hole. When the group of item cards is finished and a blank card having a special hole is now following, said hole is analyzed by the brush $sb^1$ being plugged for this instance, upon closure of the cam contact $n$ and an impulse is emitted to the storing relay S. The operating time of the cam contact $n^3$ has herein been so chosen that it closes when the special hole is under the brush $sb^1$. The relay S responds and actuates its contacts $s_I$, $s_{II}$, and $s_{III}$. The contact $s_I$ is closed and thereby establishes a holding circuit through the contact $n^2_I$ to the relay S, so that the latter remains energized also after emission of the impulse through the brush $sb^1$.

When this operating cycle is finished and when the next operating cycle begins the cam contacts $n^2_I$, $n^2_{II}$ and $n^2_{III}$ are—as in each operating cycle—temporarily actuated. The cam contact $n^2_I$ is hereby shifted and interrupts the holding circuit to the relay S and establishes the current circuit to the relay H through the contact $s_{II}$ which is still closed at this time. The cam contact $n^2_I$ is hereby constructed as a serially shifting contact, that means it closes the circuit to the relay H before the circuit to the relay S is interrupted. The relay H responds and actuates its contacts $h_I$ to $h_{IV}$ by which the total taking cycle is started: the contact $h_I$ is shifted, interrupts the circuit to the brushes $b^1$ and to the magnets A of the accumulator and establishes the current circuit to the brushes $b^2$ and to the analysis of the accumulator. The contact $h_{II}$ is closed and therewith prepares a current circuit to the zeroizing magnet E. The contact $h_{III}$ closes also, therewith establishing a circuit through the cam contact $n^1_{II}$, which is closed at this time. The cam contact $n^1_{II}$ is actuated by the same cams as the contact $n^1_I$.

In the operating cycle being considered now, that means after shifting, the cam contacts $n^1_I$ and $h_I$ have (as already mentioned above) shifted. Analysis of the accumulator and transferring the group perforations from the last item card to the punching mechanism L is now effected. In this instance it shall be assumed that the group data shall be punched into the first deck and the total into the second deck. This measure is only dependent on the plugging. The perforation of the group number and of the total may equally well be effected in one of the two decks or reversely as in the example assumed. While the first deck is fed past the punching device, at the same time the first deck of the last item card is analyzed by the brushes $b^2$. In accordance with the perforation the brushes $b^2$ will emit impulses through the shifting contacts $u^1$ to the magnets L of the punching mechanism, said magnets punching the blank card accordingly. After the first deck has been fed past the punching device the cam contact $u^1$ shifts and accordingly connects the accumulator places $a$ to the magnets L of the punching mechanism. The known impulse emitter $i$ rotates herein in synchronism with the card movement which emitter has been only provided once for all accumulator places. According to the position of the individual accumulator places impulses are emitted to the magnets L of the punching mechanism through the contacts $u^1$ so that the total is punched into the blank card. The second deck of this card having also passed under the punches, the cam contact $n^1_I$ returns to its initial position and establishes a circuit through the contact $h_{II}$ which is closed at this time, to the zeroizing magnet E which effects zeroizing of the accumulator. Shortly before the cam contact $n^1_{II}$ closes at the beginning of the next operating cycle, the cam contact $n^2_{II}$ opens and interrupts thereby the holding circuit to the relay H which becomes deenergized and sets the machine by means of its contacts again for the analysis of the item cards.

If two blank cards follow a group of item cards the machine is stopped for error indication. This stopping takes place by means of the three contacts $n^2_{III}$, $h_{IV}$ and $s_{III}$. If there is no error in the card sequence always one of the contacts $n^2_{III}$, $h_{IV}$ or $s_{III}$ is closed so that the circuit to the motor M is not interrupted. If, however, a blank card having a summary hole is followed by a second blank card being equipped with a summary hole the circuit to the motor M is interrupted as soon as the brush $sb^1$ detects the second time a special hole. It is true that when a special hole has been detected also in the previous operating cycle, in the following operating cycle the relay H is energized for total taking and accordingly its contact $h_{IV}$ is opened. If now the brush $sb^1$ detects a special hole in the subsequent card during this operating cycle the relay S responds as has been already described above and opens its contacts $s_{III}$ by means of which the current to the motor is interrupted and the machine becomes stationary.

The task of the cam contact $n^2_{III}$ is to establish the circuit to the motor M for the moment at which a total taking cycle starts, and said cam contact is actuated at the beginning of each operating cycle as the other cam contacts $n^2$. At this moment the two relays S and H have responded temporarily at the same time, thereby having opened their contacts $h_{IV}$ and $s_{III}$. Accordingly, stopping of the machine cannot take place in this instance, since, as is understood, $n^2_{III}$ is closed.

If totals of higher order shall be obtained from the summary card, as has already been mentioned above the summary cards of the lower order are to be considered as item cards and to be added up. Punching of the total of the higher order is then effected into a blank card which is also equipped with a controlling hole, but in a place other than in the first summary card. For this computation the relay S is not plugged to the brush $sb^1$ but to the brushes $sb^2$ or $sb^3$, below which the summary hole of the main or super group summary card is placed upon closing of the cam contact $n^3$.

For reasons of clearness an accumulator of the known type will be briefly described here, of a form which may be used for the machine described herein. It is an accumulator as used in a similar manner, for instance in the known Hollerith machines. The shaft 21 rotates always uniformly in the clockwise direction synchronously with the card movement. On the shaft 21 the clutches 22 are mounted for axial movement while being held against rotation relative to the shaft. The clutches 22 are held disengaged from the gear 23 by the levers 24, said gear being loosely and rotatably mounted upon the shaft 21 but held against axial movement thereon. If one of the magnets A is energized it attracts its armature 25, thereby releasing the blocking of the lever 24 and causing the clutch 22 to be pressed by a spring against the gear 23. Energization of the magnet A depends upon whether the associated brush $b^1$ encounters a hole in the card and thereby closes the circuit through the magnet. When the analysis of the card is finished all released levers 24 are again restored to their home position by means of the bar 26 and thereupon the clutches are disengaged.

The rotating movement of the gear 23, thus effected, is transferred to the gear 27 and the gear 37. The gear 27 is connected to the ratchet wheel 29 and is rotatably mounted upon the shaft 28. Ratchet wheel 29, pawl 31, lever 32, 33, spring 34 and yoke 35 serve in a known manner for the tens transfer and for zeroizing.

If the accumulator is to be zeroized, the shaft 28 is rotated once in the counter-clockwise direction. In the shaft there is provided a recess into which the pawl 36 drops according to the setting of the associated denominational accumulator element, thereby taking the latter to the zero position.

Upon the gear 37 there is provided the insulating body 39 which holds the brush 41. According to the accumulator setting the said brush slides over a commutator 43 having the contact lamellae 42. The opposite brush 41 slides always over a contact path which is not illustrated in detail herein. According to the setting of the accumulator element the brush 41 is set to any one of the contact lamellae 42 thereby permitting reading of the accumulator setting, as has already been described above.

I claim:

1. In a machine controlled by cards having index marks, a detail card controlled result card marking device for detail and result cards differing from each other by a control mark and having a row of adjacent record columns each column consisting of a number of index positions for the index marks, the detail cards being sorted according to group designations and blank result cards being interposed between the groups of detail cards, the device comprising, in combination, a card magazine for receiving the stack of detail cards and interposed blank result cards, feeding path means defining a feeding path for said cards, means for feeding said cards one by one from said magazine along said feeding path, index position by index position, with the row of record columns transverse of the feeding direction, a single row of marking devices arranged transversely of said feeding path and comprising one marking device for each record column, a single row of analyzers arranged transversely of said feeding path, comprising a single analyzer for each record column, accumulators under the control of said detail card analyzers, and means responsive to said control marks to be actuated by said blank result cards before the same are fed to said row of marking devices, said responsive means setting said row of marking devices under the control of said accumulators when a blank result card is passing said row of marking devices to mark the blank result card by index marks representing results obtained by said accumulators.

2. In a punched item card controlled total card punching machine for cards having a row of adjacent record columns each column consisting of a number of index positions for the perforations, the item cards being sorted according to group designations and blank total cards being interposed between the groups of item cards, the item cards and total cards differing from each other by a control mark, the device comprising, in combination, a card magazine for receiving the stack of item cards and interposed blank total cards, feeding path means defining a feeding path for said cards, means for feeding said cards one by one from said magazine along said feeding path, index position by index position, with the row of record columns transverse of the feeding direction, a single row of punches arranged transversely of said feeding path and comprising one punch for each record column, a single row of analyzers arranged transversely of said feeding path, comprising a single analyzer for each record column, accumulators under the control of said analyzers when the item cards are passing the latter, and means responsive to said control marks to be actuated by said blank total cards before the same are fed to said row of punches, said responsive means setting said row of punches under the control of said accumulators when a blank total card is passing said row of punches to punch in the blank total card totals obtained by said accumulators.

3. In a punched item card controlled total card punching machine for cards having a row of adjacent record columns each column consisting of a number of index positions for the perforations, the item cards being sorted according to group designations and blank total cards being interposed between the groups of item cards, the item cards and total cards differing from each other by a control mark, the device comprising, in combination, a card magazine for receiving the stack of item cards and interposed blank total cards, feeding path means defining a feeding path for said cards, means for feeding said cards one by one from said magazine along said feeding path in a step by step manner, index position by index position, with the row of record columns transverse of the feeding direction, a single row of punches arranged transversely of said feeding path and comprising one punch for each record column, a single row of analyzers arranged transversely of said feeding path, comprising a single analyzer for each record column and arranged behind said row of punches in the feeding direction of the cards, accumulators under the control of said analyzers when the item cards are passing the latter, and means responsive to said control marks to be actuated by said blank total cards before the same are fed to said row of punches, said total card responsive means setting said row of punches under the control of said accumulators when a blank total card is passing said row of punches to punch in the blank total card totals obtained by said accumulators.

4. In a punched item card controlled total card punching machine for cards having a row of adjacent record columns each column consisting of a number of index positions for the perforations, the item cards being sorted according to group designations and blank total cards being interposed between the groups of item cards, the item cards and total cards differing from each other by a control mark, the device comprising, in combination, a card magazine for receiving the stack of item cards and interposed total blank cards, feeding path means defining a feeding path for said cards, means for feeding said cards one by one from said magazine along said feeding path in a step by step manner, index position by index position, with the row of record columns transverse of the feeding direction, a single row of punches arranged transversely of said feeding path and comprising one punch for each record column, a single row of analyzers arranged transversely of said feeding path, comprising a single analyzer for a record column and arranged behind said row of punches in the feeding direction of the cards, accumulators under the control of said analyzers when the item cards are passing the latter, and means arranged in said feeding path in the feeding direction of the cards before said row of punches and responsive to said control marks to be actuated by said blank total cards before the same are reaching the row of punches, said responsive means setting said row of punches under the control of said accumulators when a blank total card is passing said row of punches to punch in the blank total card totals obtained by said accumulators.

5. In a punched item card controlled total card punching machine, the item cards being sorted according to group designations and blank total cards being interposed between the groups of item cards, the item cards and total cards differing from each other by a control mark, the device comprising, in combination, a card magazine for receiving the stack of items cards and interposed total blank cards, feeding path means defining a feeding path for said cards, means for feeding said cards along said feeding path, a punching mechanism arranged in said feeding path, analyzing means arranged in said feeding path for the item cards, accumulators under the control of said item card analyzers when the item cards are passing the latter, designation analyzers arranged in said feeding path behind the punching mechanism in the feeding direction of the cards, said designation analyzers being positioned in said feeding path for analyzing the last card of a group of cards while the associated blank total card is under the punching mechanism, means responsive to said control marks to be actuated by said blank total cards before the same are fed to said punching mechanism, said responsive means setting said punching mechanism under the simultaneous control of said item accumulators and of said group designations analyzers when the blank total card is in the punching mechanism to punch the total obtained by said accumulators as well as the associated group designation in the blank total card.

6. In a punched item card controlled total card punching machine for cards having a row of adjacent record columns each column consisting of a number of index positions for the perforations, the item cards being sorted according to group designations and blank total cards being interposed between the groups of item cards, the item cards and total cards differing from each other by a control mark, the device comprising, in combination, a card magazine for receiving the stack of item cards and interposed blank total cards, feeding path means defining a feeding path for said cards, means for feeding said cards with the row of columns transverse of the feeding direction one by one from said magazine along said feeding path in a step by step manner, index position by index position, a single row of punches arranged transversely of said feeding path and comprising one punch for each record column, a single row of item analyzers arranged transversely of said feeding path, comprising a single analyzer for each item column and arranged behind said row of punches in the feeding direction of the cards, accumulators under the control of said analyzers when the item cards are passing the latter, a single row of group designation analyzers arranged transversely of said feeding path behind the row of item analyzers in the feeding direction of the cards and comprising a single analyzer for each group designation column, said designation analyzers being positioned in said feeding path for analyzing the last card of a group of cards while the associated blank total card is passing synchronously under the row of punches, means responsive to said control marks to be actuated by said blank total cards before the same are fed to said row of punches, said responsive means setting set row of punches under the control of said item accumulator and of said group designation analyzers when the blank total card is passing said row of punches to punch the total obtained by said accumulators as well as the associated group designation in the blank total card.

7. In a machine controlled by cards having index marks, a detail card controlled result card marking device for detail and result cards differing from each other by a control mark and having each several rows of adjacent record columns each column consisting of a number of index positions for the index marks, the detail cards being sorted according to group designations and the blank result cards being interposed between the groups of detail cards, the device comprising, in combination, a card magazine for receiving the stack of detail cards and interposed blank result cards, feeding path means defining a feeding path for said cards, means for feeding said cards one by one from said magazine along said feeding path, a marking device in said feeding path common to the several rows of record columns, detail card analyzing means for the rows of record columns, accumulators under the control of said detail card analyzers, means for automatically connecting said detail card analyzers to different accumulators upon the subsequent passage of the different rows of columns past said detail card analyzers, means responsive to said control marks to be actuated by said blank result cards before the same are fed to said marking device, said responsive means setting said marking device under the control of said accumulators when a blank result card is passing said marking device to mark the blank result card by index marks representing results obtained by said accumulators, and means for setting the same marking device under the control of different accumulators upon the subsequent passage of different rows of columns past said marking device common to a plurality of rows of columns.

8. In a punched item card controlled total card punching machine for cards having each several rows of adjacent record columns each column consisting of a number of index positions for the perforations, the item cards being sorted according to group designations and the blank total cards being interposed between the groups of item cards, the item cards and total cards differing from each other by a control mark, the device comprising, in combination, a card magazine for receiving the stack of item cards and interposed blank total cards, feeding path means defining a feeding path for said cards, means for feeding said cards one by one from said magazine along said feeding path in a step by step manner, index position by index position, with the row of record columns transverse of the feeding direction, a single row of punches common to the several rows of record columns and arranged transversely of said feeding path, comprising one punch for aligned record columns in the several rows of record columns, a single row of analyzers common to the several rows of record columns and arranged transversely of said feeding path, comprising a single analyzer for aligned record columns in the several rows of record columns, accumulators under the control of said item card analyzers, means for automatically connecting said item card analyzers to different accumulators upon the subsequent passage of the different rows of columns past said item card analyzers, means responsive to said control marks to be actuated by said blank total cards before the same are fed to said row of punches, said responsive means setting said row of punches under the control of said accumulators when a blank total card is passing said row of punches to punch in the blank total card totals obtained by said accumulators, and means for setting the same punches under the control of different accumulators upon the subsequent passage of different rows of columns past said punches common to a plurality of rows of columns.

9. In a machine controlled by cards having index marks, a detail card controlled result card marking device for detail and result cards differing from each other by a control mark and having a row of adjacent record columns each column consisting of a number of index positions for the index marks, the detail cards being sorted according to group designations and blank result cards being interposed between the groups of detail cards, the device comprising, in combination, a card magazine for receiving the stack of detail cards and interposed blank result cards, feeding path means defining a feeding path for said cards, means for feeding said cards one by one from said magazine along said feeding path in a step by step manner, index position by index position, with the row of record columns transverse of the feeding direction, a single row of marking devices arranged transversely of said feeding path and comprising one marking device for each record column, a single row of analyzers arranged transversely of said feeding path, comprising a single analyzer for each record column, accumulators under the control of said detail card analyzers, and means responsive to said control marks to be actuated by said blank result cards before the same are reaching the row of marking devices, said responsive means setting said row of marking devices under the control of said accumulator when a blank result card is passing said row of marking devices to mark the blank result card by index marks representing results obtained by said accumulators, said result card responsive means including manually operated selecting means to cause response of said responsive means to preselected portions of said result cards.

10. In a punched item cards controlled total card punching machine for cards having a row of adjacent record columns each column consisting of a number of index positions for the perforations, the item cards being sorted according to group designations and blank total cards being interposed between the group of item cards, the item cards and total cards differing from each other by a control mark, the device comprising, in combination, a card magazine for receiving the stack of item cards and interposed total blank cards, feeding path means defining a feeding path for said cards, means for feeding said cards one by one from said magazine along said feeding path in a step by step manner, index position by index position, with the row of record columns transverse of the feeding direction, a single row of punches arranged transversely of said feeding path and comprising one punch for each record column, a single row of analyzers arranged transversely of said feeding path, comprising a single analyzer for each record column, accumulators under the control of said analyzers when the item cards are passing the latter, and means responsive to said control marks to be actuated by said blank total cards before the same are fed to said row of punches, said responsive means setting said row of punches under the control of said accumulator when a blank total card is passing said row of punches to punch the total in the blank total card, said result card responsive means including manually operated selecting means to cause responsive of said responsive means to preselected portions of said result cards.

11. In a punched item cards controlled total card punching machine for cards having a row of adjacent record columns each column consisting of a number of index positions for the perforations, the item cards being sorted according to group designations and blank total cards being interposed between the group of item cards, the item cards and total cards differing from each other by a control mark, the device comprising, in combination, a card magazine for receiving the stack of item cards and interposed total blank cards, feeding path means defining a feeding path for said cards, means for feeding said cards one by one from said magazine along said feeding path in a step by step manner, index position by index position, with the row of record columns transverse of the feeding direction, a single row of punches arranged transversely of said feeding path and comprising one punch for each record column, a single row of analyzers arranged transversely of said feeding path, comprising a single analyzer for each record column and arranged behind said row of punches in the feeding direction of the cards, accumulators under the control of said analyzers when the item cards are passing the latter, and means arranged in the feeding direction of the cards before said row of punches and responsive to said control marks to be actuated by said blank total cards before the same are fed to said row of punches, said responsive means setting said row of punches under the control of said accumulators when a blank total card is passing said row of punches to punch in the blank total card totals obtained by said accumulators and including a row of manually operated selecting analyzers arranged in a row in the feeding direction of the cards to cause response of said responsive means to preselected portions of said total cards.

12. In a card controlled machine, a result card marking device, comprising, in combination, feeding path means defining a feeding path for cards; a row of marking means transversely extending across said feeding path; a row of analyzers arranged in said feeding path spaced from said marking means, and transversely extending across said feeding path; feeding means for feeding cards comprising groups of detail cards and blank result cards, said detail cards and said result cards differing from each other by a control mark, each blank result card being arranged after one group of detail cards, each detail card having a row of adjacent data columns consisting of spaced index marks representing data, said feeding means feeding said cards along said feeding path in direction of said columns in consecutive steps corresponding to the spacing of said index marks to said row of marking means and feeding said cards to said row of analyzers index position by index position so that each analyzer successively analyzes the index marks in one column of said detail cards; accumulators connected to said analyzers and being controlled by the same to totalize data represented by index marks in said detail cards; connecting means for connecting said accumulators to said marking means;

sensing means for sensing said control marks and being positioned in said feeding path forwardly of said marking means in said feeding direction, said sensing means being connected to said connecting means and actuating the same to connect said marking means to said accumulators when a blank result card sensed by said sensing means has been fed to said row of marking means so that said marking means mark said blank result cards corresponding to results obtained by said accumulators from data in said detail cards.

13. In a card controlled machine, a result card marking device, comprising, in combination, feeding path means defining a feeding path for cards; a row of marking means transversely extending across said feeding path; a row of analyzers arranged in said feeding path spaced from said marking means, and transversely extending across said feeding path; feeding means for feeding cards comprising groups of detail cards having group designation marks and blank result cards, each blank result card being arranged after one group of detail cards, each detail card having a row of adjacent data columns consisting of spaced index marks representing data and each blank result card having at least one control mark, said feeding means feeding said cards along said feeding path in direction of said columns in consecutive steps corresponding to the spacing of said index marks to said row of marking means and to said row of analyzers so that each analyzer successively analyzes the index marks in one column of said detail cards; accumulators connected to said analyzers and being controlled by the same to totalize data represented by index marks in said detail cards; connecting means for connecting said accumulators to said marking means; group designation mark analyzers for analyzing group designation marks, said group designation mark analyzers being positioned in said feeding path behind said marking means in the feeding direction of the cards for analyzing the last card of a group of cards while the blank result card associated with the respective group of cards is under said row of marking means; other connecting means connecting said group designation mark analyzers to said marking devices; sensing means for sensing said control marks in said blank result cards and being positioned in said feeding path forwardly of said marking means in said feeding direction, said sensing means being connected to said first mentioned connecting means and to said other connecting means and actuating the same to connect said marking means to said accumulators and to said group designation mark analyzers when a blank result card whose control mark is sensed by said sensing means has been fed to said row of marking means so that said marking means mark said blank result cards with result marks corresponding to results obtained by said accumulators from data in said detail cards and with group designation marks corresponding to the group designation marks analyzed by said group designation mark analyzers.

14. In card controlled machine, a result card marking device, comprising, in combination, feeding path means defining a feeding path for cards; a row of marking means transversely extending across said feeding path; a row of analyzers arranged in said feeding path spaced from said marking means, and transversely extending across said feeding path; feeding means for feeding cards comprising groups of detail cards and blank result cards, each blank result card being arranged after one group of detail cards, each detail card having a row of adjacent data columns consisting of spaced index marks representing data and each blank result card having a pluraliyt of control marks, said feeding means feeding said cards along said feeding path in direction of said columns in consecutive steps corresponding to the spacing of said index marks to said row of marking means and to said row of analyzers so that each analyzer successively analyzes the index marks in one column of said detail cards; accumulators connected to said analyzers and being controlled by the same to totalize data represented by index marks in said detail cards; connecting means for connecting said accumulators to said marking means; sensing means for sensing said control marks in said blank result cards and being positioned in said feeding path forwardly of said marking means in said feeding direction, said sensing means including selecting means for selectively associating said sensing means with any one of said plurality of control marks on each of said blank result card, said sensing means being connected to said connecting means and actuating the same to connect said marking means to said accumulators when a blank result card whose control mark is sensed by said sensing means has been fed to said row of marking means so that said marking means mark said blank result cards corresponding to results obtained by said accumulators from data in said detail cards.

15. In a card controlled machine, a result card marking device, comprising, in combination, feeding path means defining a feeding path for cards; a row of marking means transversely extending across said feeding path; a row of analyzers arranged in said feeding path spaced from said marking means, and transversely extending across said feeding path; feeding means for feeding cards comprising groups of detail cards having group designation marks and blank result cards, each blank result card being arranged after one group of detail cards, each detail card having a row of adjacent data columns consisting of spaced index marks representing data and each blank result card having a plurality of control marks, said feeding means feeding said cards along said feeding path in direction of said columns in consecutive steps corresponding to the spacing of said index marks to said row of marking means and to said row of analyzers so that each analyzer successively analyzes the index marks in one column of said detail cards; accumulators connected to said analyzers and being controlled by the same to totalize data represented by index marks in said detail cards; connecting means for connecting said accumulators to said marking means; group designation mark analyzers for analyzing group designation marks, said group designation mark analyzers being positioned in said feeding path behind said marking means in the feeding direction of the cards for analyzing the last card of a group of cards while the blank result card associated with the respective group of cards is under said row of marking means; other connecting means connecting said group designation mark analyzers to said marking devices; sensing means for sensing said control marks in said blank result cards and being positioned in said feeding path forwardly of said marking means in said feeding direction, said sensing means including selecting means for selectively associating said sensing means with any one of said plurality of control marks on each of said blank result card, said sensing means being connected to said first mentioned connecting means and to said other connecting means and actuating the same to connect said marking means to said accumulators and to said group designation mark analyzers when a blank result card whose control mark is sensed by said sensing means has been fed to said row of marking means so that said marking means mark said blank result cards with result marks corresponding to results obtained by said accumulators from data in said detail cards and with group designation marks corresponding to the group designation marks analyzed by said group designation mark analyzers.

References Cited in the file of this patent
UNITED STATES PATENTS
2,161,592    Rowley _____ June 6, 1939